(12) United States Patent
Bawks

(10) Patent No.: US 7,871,350 B2
(45) Date of Patent: Jan. 18, 2011

(54) DIFFERENTIAL HOLDOUT RING ARRANGEMENT

(75) Inventor: James R. Bawks, Harrison Township, MI (US)

(73) Assignee: Eaton Corporation, Cleveland, OH (US)

( * ) Notice: Subject to any disclaimer, the term of this patent is extended or adjusted under 35 U.S.C. 154(b) by 444 days.

(21) Appl. No.: 12/011,719

(22) Filed: Jan. 29, 2008

(65) Prior Publication Data

US 2009/0188345 A1 Jul. 30, 2009

(51) Int. Cl.
*F16H 48/20* (2006.01)
(52) U.S. Cl. .................................. 475/231; 475/235
(58) Field of Classification Search ............... 475/231, 475/235, 223, 232; 74/640
See application file for complete search history.

(56) References Cited

U.S. PATENT DOCUMENTS

| | | | |
|---|---|---|---|
| 2,329,059 A | 9/1943 | Knoblock | |
| 2,638,794 A | 5/1953 | Knoblock | |
| 2,667,087 A * | 1/1954 | Myers | 74/650 |
| 2,667,088 A * | 1/1954 | Myers | 74/650 |
| 2,830,466 A * | 4/1958 | Myers | 74/650 |
| 3,791,238 A | 2/1974 | Bokovoy | |
| 4,128,021 A * | 12/1978 | Knowles | 74/650 |
| 4,424,725 A | 1/1984 | Bawks | |
| 4,524,640 A * | 6/1985 | Neumann et al. | 74/650 |
| 4,745,818 A | 5/1988 | Edwards | |
| 5,524,509 A * | 6/1996 | Dissett | 74/650 |
| 5,901,618 A * | 5/1999 | Tyson et al. | 74/650 |
| 6,053,073 A * | 4/2000 | Tyson et al. | 74/650 |

* cited by examiner

*Primary Examiner*—Tisha D Lewis
(74) *Attorney, Agent, or Firm*—Dykema Gossett PLLC

(57) ABSTRACT

A locking differential includes an annular center cam member freely rotatably supported within an annular central driver member without the use of any keying device, such as a snap ring, thereby to simply the construction and assembly of the differential, and to reduce cost. The center cam member is longitudinally maintained in place by the biasing forces applied to the clutch members arranged on opposite sides of the central driver member by helical compression springs arranged externally concentrically about the side gears, respectively, and by the holdout rings that are connected with the clutch members. The center cam member and the central driver member have adjacent outer and inner circumferential surfaces, respectively, that are smooth, continuous, and uninterrupted. The holdout rings are rotatably connected at their remote ends with the clutch members by integral annular outer ribs that extend within corresponding grooves contained in the counterbore wall surfaces.

4 Claims, 5 Drawing Sheets

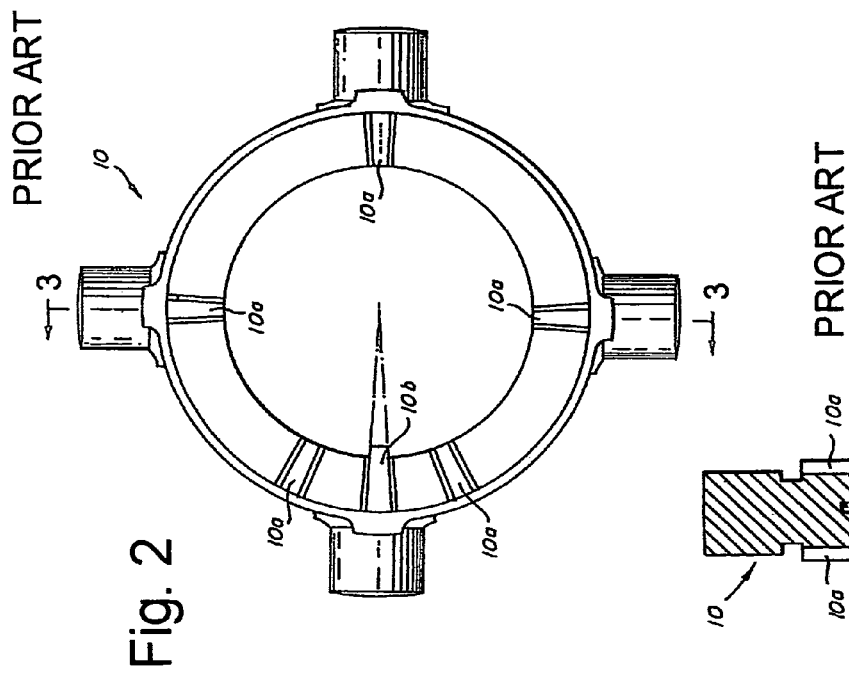
Fig. 2 PRIOR ART
Fig. 3 PRIOR ART
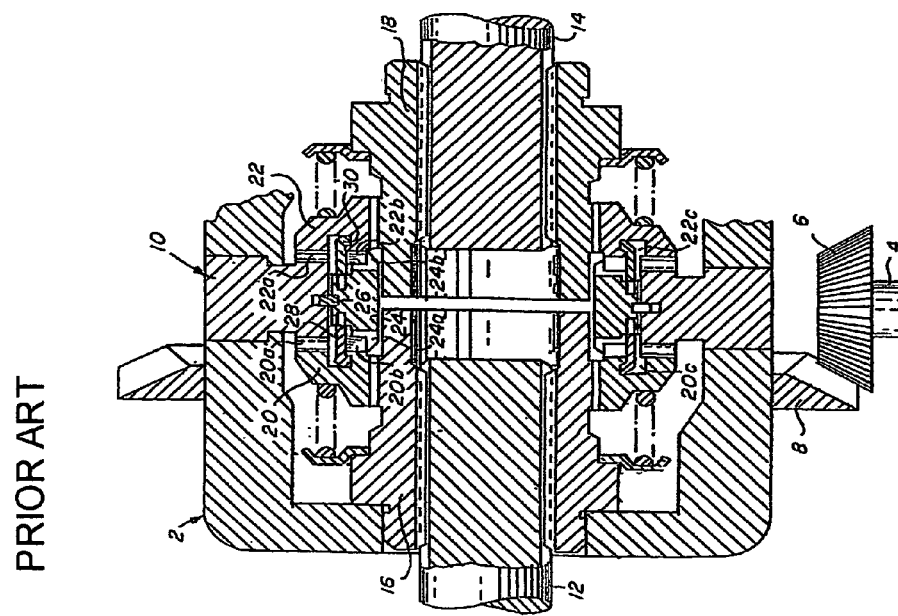
Fig. 1 PRIOR ART

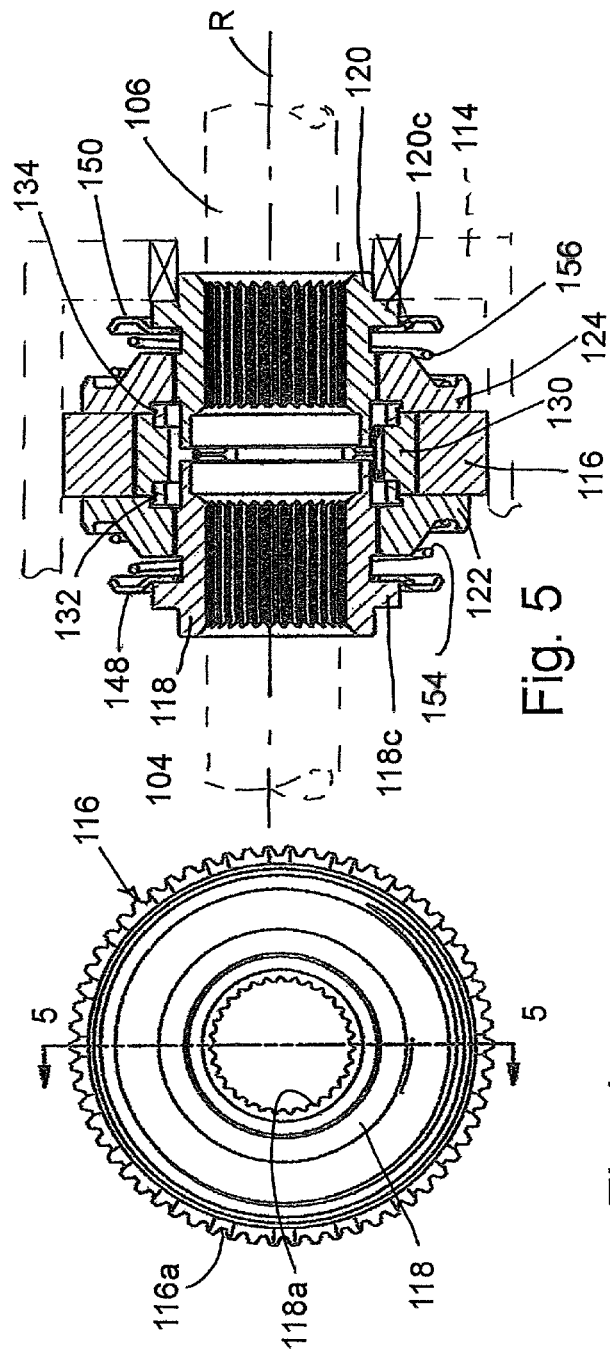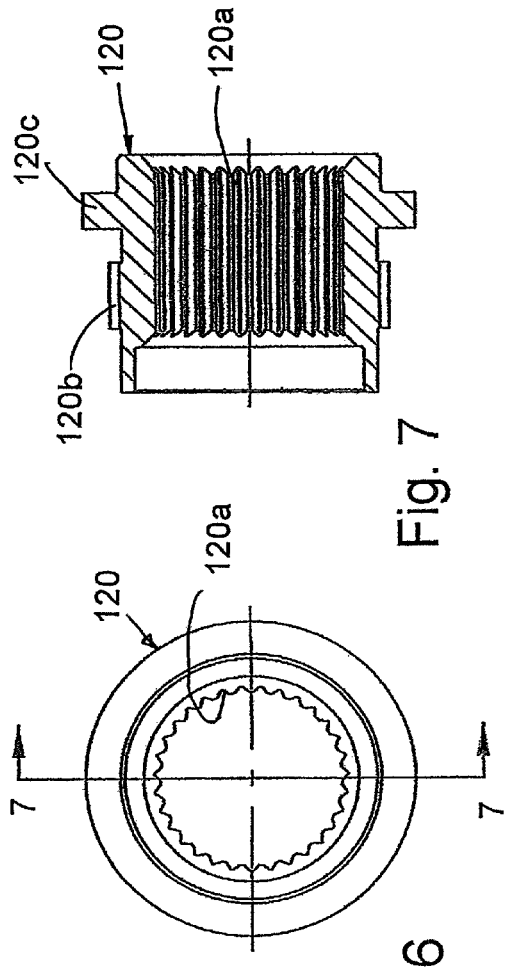
Fig. 4
Fig. 5
Fig. 6
Fig. 7

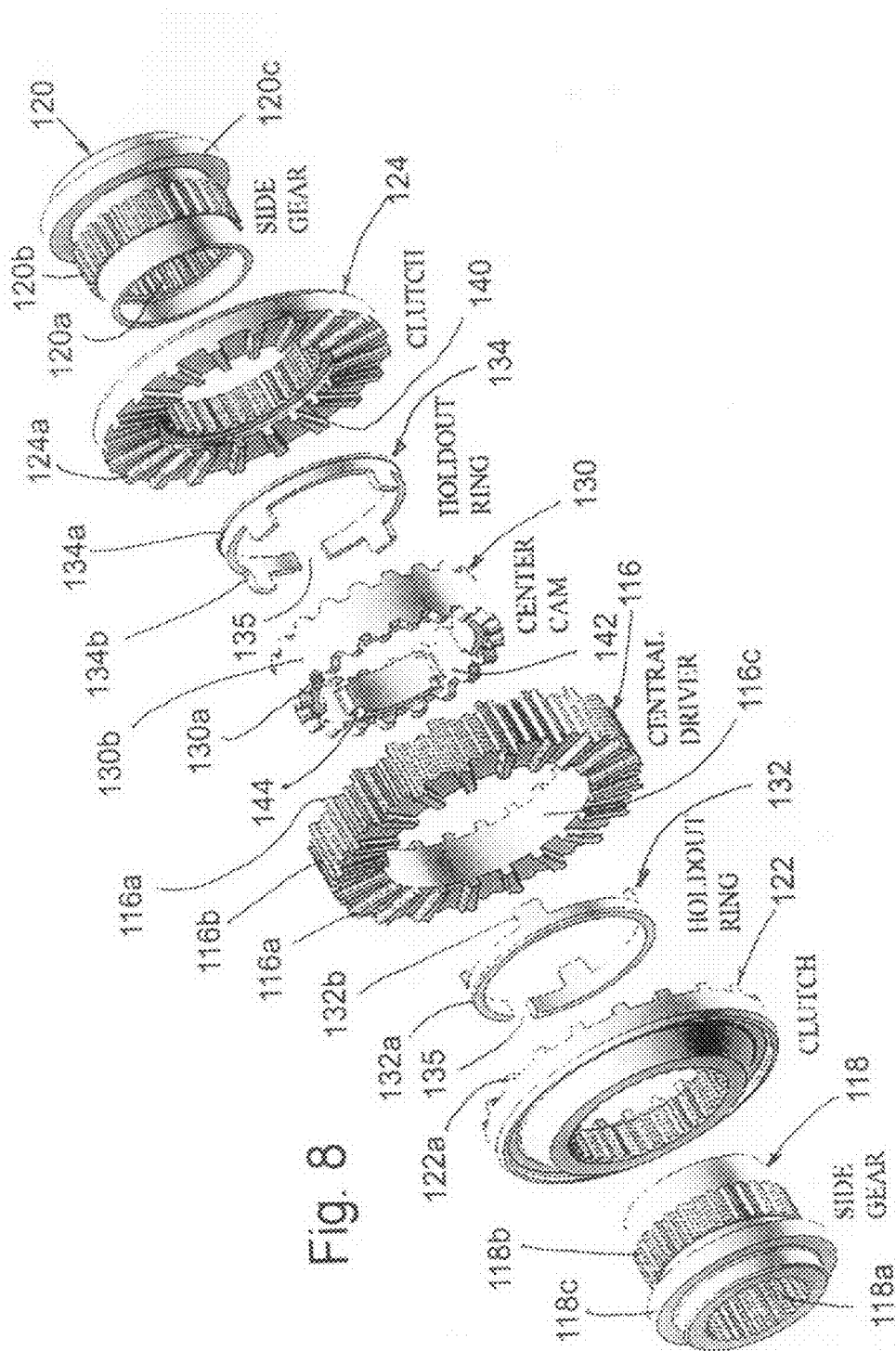

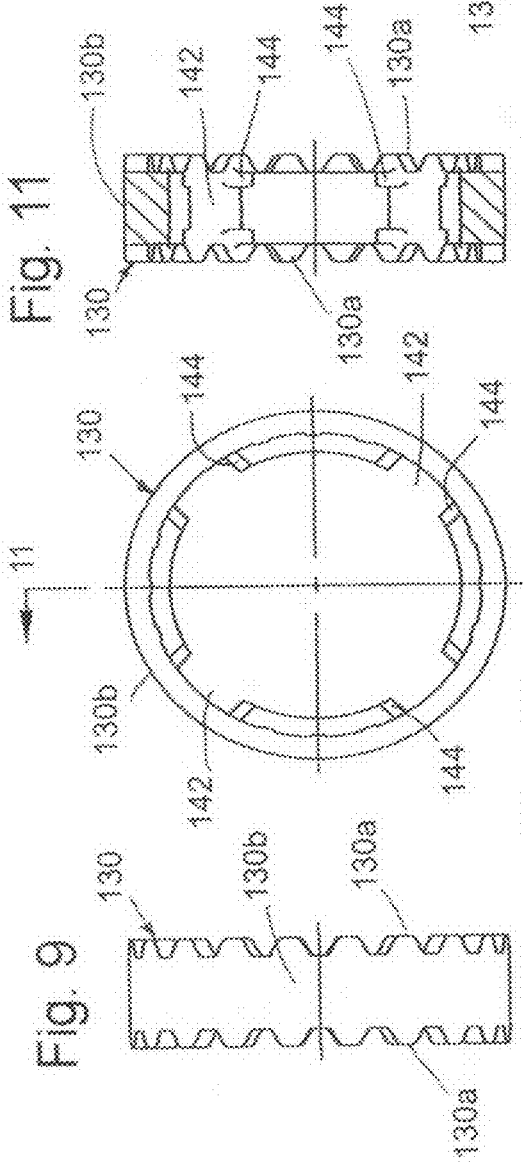

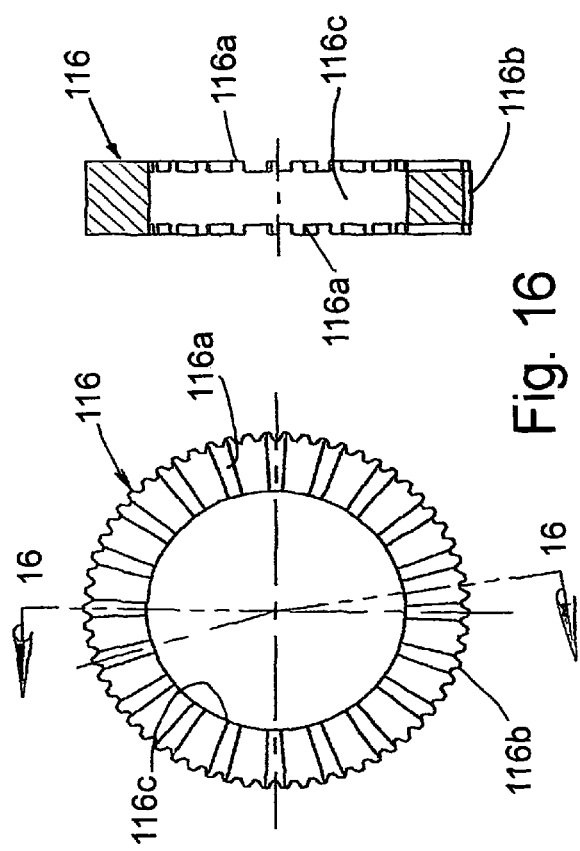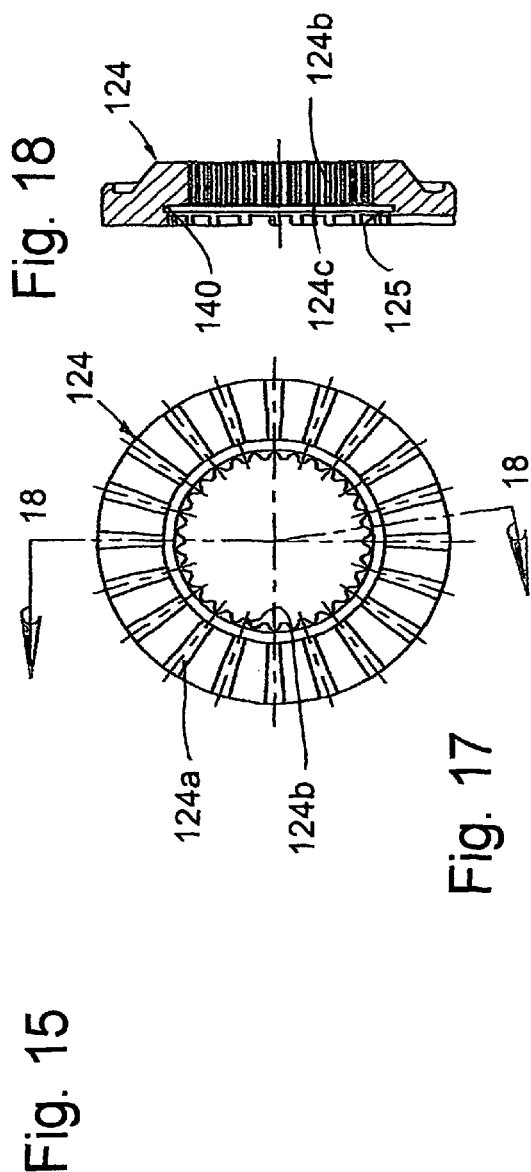

DIFFERENTIAL HOLDOUT RING ARRANGEMENT

BACKGROUND OF THE INVENTION

1. Field of the Invention

A locking differential includes an annular center cam member freely rotatably supported within an annular central driver member without the use of any keying device, such as a snap ring, thereby to simply the construction and assembly of the differential, and to reduce cost. The center cam member and the central driver member have adjacent outer and inner circumferential surfaces, respectively, that are smooth, continuous, and uninterrupted. The holdout rings are rotatably connected at their remote ends with the clutch members by integral annular outer ribs that extend within corresponding grooves contained in the counterbore wall surfaces.

2. Description of Related Art

Locking differentials are well known in the patented prior art, as evidenced by the patents to Knoblock U.S. Pat. No. 2,329,059, Bawks (the present inventor) U.S. Pat. No. 4,424,725, and Edwards et al U.S. Pat. No. 4,745,818. In these prior art patents, the annular center cam member is normally arranged concentrically within, and keyed to (by a snap ring or the like), the annular central driver member, thereby to prevent relative axial displacement between the two components. When one output shaft overruns the other by a predetermined amount, the overrunning clutch member slidably mounted on the side gear associated with the overrunning shaft is cammed out by the teeth on the central driver member and on the clutch members, thereby to disengage the overrunning output shaft as long as the overrunning condition exists.

These known differentials require a relatively large number of complicated parts, and are difficult and expensive to manufacture and assemble. For example, in the Bawks and Knoblock patents, the spring biasing means for the locking differentials are arranged concentrically within the clutch members and the center cam member, thereby complicating the assembly and servicing of the differential. In the clutch members of the Edwards patent, the camming teeth are arranged in a circular pattern adjacent the inner circumference of the opposed faces of the clutch members, and the driving teeth are arranged in an outwardly spaced circular pattern adjacent the outer circumferences of the clutch members, with the holdout rings being mounted at their remote ends in grooves contained in the clutch member faces between the cam teeth and the driving teeth.

Some of the known differentials present the problem that the holdout ring can jump over the spider key during a speed variation between the spider and clutch, thereby causing the clutch to be non-parallel with the spider. This will result in damage to the clutch teeth and failure of the differential.

The present invention was developed to provide an improved less costly locking differential that requires fewer parts, is easier to manufacture and assemble, and is more durable in operation, and easier to service.

SUMMARY OF THE INVENTION

Accordingly, a primary object of the present invention is to provide an improved locking differential that eliminates the need for key means between the center cam member and the central driver members, such that the adjacent outer and inner circumferential surfaces of the concentrically arranged center cam and central driving members are smooth, continuous and uninterrupted. The biasing spring means include a pair of helical compression springs arranged concentrically externally about the side gears, respectively, thereby to bias the clutch members inwardly together toward the central driving member arranged therebetween.

Another object of the invention is to provide a differential wherein the clutch teeth at the adjacent ends of the clutch members are continuous and unitary, whereby the cam teeth on the center cam member engage the clutch teeth adjacent the inner circumferential portion of the clutch members, and the driving teeth on the central driving member engage the corresponding clutch teeth adjacent the outer circumference of the clutch members.

According to another object, the annular holdout rings are formed from bar stock, forged powder metal or a sheet of resilient metal material and include at their remote ends on their outer circumferential surfaces annular ribs that extend within corresponding grooves contained in counterbore wall surfaces within the clutch members, respectively. The holdout rings are provided at their other ends with a plurality of circumferentially-spaced axially-extending integral lugs that normally extend within corresponding through slots contained in the center cam member. The holdout rings are resiliently biased radially outwardly into engagement with the counterbore wall surfaces of the clutch members, respectively, whereby when one overrunning clutch member is cammed out to the disengaged condition, the holdout ring associated therewith is rotatably dragged through a small angle to cause a corner extremity of the lug to be seated in a holdout notch provided at the free edge of the associated center cam member through slot.

The new differential design will prevent the holdout ring from jumping the key. This is accomplished by moving the holdout ring locating surface from the spider/central driver to the center cam, and by providing an additional length of contact between the holdout ring lug and the center cam locating shoulder. The holdout ring cannot climb over the center cam locating shoulder and therefore the clutch cannot become non-parallel with the spider/central driver. This will prevent tooth damage due to partial contact.

This improves the strength of the clutch cam teeth, which cause the clutch to disengage from the spider/central driver drive teeth during a wheel speed variation. This is accomplished by moving the holdout ring groove inward on the clutch, allowing the clutch cam teeth to become an extension to the clutch drive teeth. By eliminating the spider/central driver key, the corresponding manufacturing steps are correspondingly eliminated.

BRIEF DESCRIPTION OF THE DRAWINGS

Other objects and advantages of the invention will become apparent from a study of the following specification, when viewed in the light of the accompanying drawing, in which:

FIG. 1 is a sectional view of a differential mechanism of the prior art;

FIG. 2 is a plan view of the spider member of the prior art differential of FIG. 1;

FIG. 3 is a detailed view taken along line 3-3 of FIG. 2;

FIG. 4 is an end view of the improved differential of the present invention, and FIG. 5 is a sectional view taken along line 5-5 of FIG. 4;

FIG. 6 is an end view of one of the side gears of FIG. 5, and

FIG. 7 is a sectional view taken along line 7-7 of FIG. 6;

FIG. 8 is an exploded view of the differential of FIG. 5;

FIGS. 9 and 10 are side and end views, respectively, of the center cam member of FIG. 5;

FIG. 11 is a sectional view taken along the line 11 of FIG. 10, and

FIG. 12 is a perspective view of the center cam member of FIG. 10;

FIG. 13 is an end view of one of the holdout rings of FIG. 5, and

FIG. 14 is a sectional view taken along the line 14-14 of FIG. 13;

FIG. 15 is an end view of the central driver member of FIG. 5, and

FIG. 16 is a sectional view taken along line 16-16 of FIG. 15;

FIG. 17 is an end view of one of the clutch members of FIG. 5, and

FIG. 18 is a sectional view taken along line 18-18 of FIG. 17.

DETAILED DESCRIPTION OF THE INVENTION

Referring first more particularly to FIGS. 1-3 (which illustrate the differential of the prior art Edwards et al U.S. Pat. No. 4,745,818), the collinearly arranged output shafts 12 and 14 are splined at their adjacent ends within side gears 16 and 18 that are journaled within openings contained in the opposed end walls of the differential casing 2. Slidably splined to the side gears are clutch members 20 and 22 that are biased together by the compression springs to effect engagement between the clutch teeth 20a, 22a with the driving teeth 10a at opposite ends of the central spider member 10. An annular center cam member 24 is keyed to the central spider member by means of a conventional snap ring 26, thereby to prevent axial displacement of the center cam member relative to the central driver member. The center cam member has cam teeth 24a and 24b that engage a corresponding set of cam teeth 20b, 22b provided on the clutch members. Arranged in the grooves contained in the clutch members between the sets of driving teeth and cam teeth are split holdout rings 28, 30 that are operable to maintain a clutch member associated with an overrunning output shaft in the cammed out disengaged condition, as is known in the art.

As shown in FIGS. 2 and 3, the spider or central driver member 10 is provided on its inner circumference with a key 10b that extends within the slits contained in the holdout rings, thereby to limit the extent of angular displacement of each holdout ring relative to the center cam member during the holdout ring operation. If this key is jumped by the holdout ring during faulty holdout ring operation, damage to the differential components can result.

Referring now to FIGS. 4 and 5, according to the improved differential of the present invention, the annular side gears 118 and 120, which are non-rotatably splined to the collinearly arranged output shafts 104 and 106, are journaled in openings contained in the opposed end walls of the rotatably driven casing 114, thereby to define an axis of rotation R. Slidably splined for longitudinal sliding displacement on the side gears are clutch members 122 and 124 that are biased together toward the central driver member 116 by helical compression springs 154 and 156 that are arranged externally in concentrically spaced relation about the side gears, respectively. At their remote ends, the compression springs engage annular spring retainer members 148, 150 that abut external integral annular shoulders 118c, 120c on the side gears, respectively. The adjacent ends of the compression springs are in engagement with the clutch members, respectively, thereby causing engagement between the clutch teeth 122a and 124a and corresponding portions of driving teeth 116a at opposite ends of the central driver member, which portions are adjacent the outer periphery of the central driver member.

Rotatably arranged concentrically within said central driver member is an annular center cam member 130 provided at each end with a circular arrangement of cam teeth 130a that are arranged to engage portions of the associated driving teeth 116a adjacent the inner circumference of the central driver member 116. In accordance with a characterizing feature of the present invention, the adjacent inner and outer circumferential surfaces of the central driver member 116c and the center cam member 130b, respectively, are smooth, continuous and uninterrupted, since the necessity of the snap ring of the prior art has been eliminated. The center cam member is provided on its inner circumference with a plurality of circumferentially-spaced longitudinal through slots 142 that terminate at each end with a pair of lateral hold-out notches 144, as will be described below.

A pair of longitudinally-spaced collinearly-arranged holdout rings 132 and 134 are provided that extend at their remote ends concentrically within counterbores 125 contained in the adjacent ends of the clutch members 122 and 124, respectively. In order to prevent relative longitudinal displacement between the holdout rings and their associated clutch members, the holdout rings are provided on their outer peripheries with annular ribs 132a and 134a that extend within corresponding grooves 140 contained in the counterbore wall surfaces. The holdout rings are formed from bar stock, forged. Powder metal or a resilient sheet metal material, are longitudinal split by slits 135, and are resiliently biased outwardly into frictional engagement with the associated clutch member, respectively. At their adjacent ends, the holdout rings are provided with a plurality of circumferentially-spaced axially-extending integral lug portions 132b and 134b that extend into opposite ends of the corresponding through slots 142 contained in the center cam member.

In operation, the output shafts 104 and 106 are normally driven at the same rotational velocity from the main drive shaft via the casing 114, central driving member 116, the clutch members 122 and 124, and the side gears 118 and 120, respectively. When the rotational velocity of one output shaft exceeds that of the other above a predetermined rotational velocity (such as occurs during a turn of the vehicle), the clutch member associated with the overrunning shaft is cammed out by the cooperation between the clutch teeth on the overrunning clutch member and the associated cam teeth 130a on the center cam member, thereby to disengage the clutch teeth of that clutch member from the driving teeth of the center cam member. The associated holdout ring is slightly dragged to cause the corner extremities of the holdout ring lugs to enter the associated notches 144 on the center cam member, thereby to maintain the clutch member in the disengaged condition. When the overrunning output shaft condition ends upon the completion of the turn, the holdout rings is rotationally dragged to its initial position, and the spring biasing force causes the lugs to again enter the cam slots, whereupon the clutch member is returned to reengage the clutch teeth with the driving teeth of the central driver member. The ring gear torque will again flow through the clutch member and the side gear into the output shaft.

While in accordance with the provisions of the patent Statutes the preferred forms and embodiments of the invention have been illustrated and described, it will be apparent to those skilled in the art that changes may be made without deviating from the invention described above.

What is claimed is:

1. A locking differential mechanism for driving a pair of spaced collinearly arranged output shafts (104, 106) from a main drive shaft, comprising:
   (a) a casing (114) driven by the drive shaft for rotation about a given axis (R) collinear with the output shaft axis, said casing containing a chamber defining a pair of opposed end walls containing aligned shaft openings for receiving the adjacent ends of the output shafts;
   (b) an annular central driver member (116) non-rotatably mounted in said chamber concentrically about said given axis, said central driver member having at each end an end surface provided with a circular arrangement of radially-extending continuous drive teeth (116*a*);
   (c) a pair of annular side gears (118, 120) mounted in said chamber for rotation about said given axis adjacent said shaft openings, respectively, said side gears being internally splined for non-rotatable connection with the adjacent ends of the output shafts, respectively;
   (d) a pair of annular clutch members (122, 124) concentrically mounted about, and splined for non-rotatable longitudinal displacement relative to, said side gears, respectively, the adjacent ends of said clutch members including a plurality of circularly spaced radially-extending clutch teeth (122*a*, 124*a*) arranged for engagement with portions of corresponding drive teeth (116*a*) adjacent the outer circumference of said central driver member, respectively;
   (e) spring means normally biasing said clutch members toward engaged positions relative to said central driver member, said spring means including a pair of compressions springs (154, 156) arranged externally concentrically about said side gears, respectively;
   (f) center cam means operable when the rotary velocity of one output shaft exceeds that of the other output shaft above a predetermined value for axially displacing toward a disengaged position the clutch member associated with said one overrunning output shaft, said disengagement means including:
      (1) an annular center cam member (130) rotatably mounted concentrically within said central driver member;
      (2) said center cam member and said central driver member having adjacent continuous smooth circumferential surfaces (130*b*, 116*c*);
      (3) said center cam member having at opposite ends a plurality of cam teeth (130*a*) arranged for engagement with corresponding portions of the clutch teeth adjacent the inner circumference of the adjacent clutch members, respectively;
      (4) said center cam member having an inner circumferential surface containing a plurality of longitudinally-extending circumferentially-spaced through slots (142);
   (g) holdout means operable from an inactive position to a lock-out position to retain the overrunning clutch member associated with the overrunning output shaft in the disengaged condition as long as the rotational velocity of the overrunning output shaft exceeds said given value, said holdout means including;
      (1) a pair of resilient annular holdout rings (132, 134) arranged concentrically about said given axis, each of said holdout rings containing a longitudinal slit (135);
      (2) said holdout rings each including a body portion having a smooth internal circumferential surface, said holdout rings having first circumferential peripheral surfaces provided with integral circumferential generally-annular rib portions (132*a*, 134*a*) that extend within corresponding grooves (140) contained within the associated clutch member, respectively, thereby to prevent longitudinal displacement of said holdout rings relative to said clutch members, respectively;
      (3) said holdout rings having second circumferential peripheral surfaces provided with a plurality of circumferentially-spaced axially extending lug portions (132*b*, 134*b*) that normally extend into said center cam member through slots, respectively;
      (4) said holdout rings being resiliently biased radially outwardly into frictional engagement with the associated clutch member, such that when the clutch member associated with an overrunning output shaft is longitudinally displaced toward the disengaged position, subsequent relative rotational movement of said clutch member causes the associated holdout ring to be rotationally dragged toward said lock-out position in which extremities of said holdout lugs are seated within lock-out notches (144) provided at each end of, and on opposite sides of, said through slots.

2. A locking differential mechanism as defined in claim 1, wherein the adjacent ends of said clutch members contain central counterbores (125) which define counterbore walls, said grooves being contained in said counterbore walls, respectively.

3. A locking differential mechanism as defined in claim 2, wherein each of said side gears is provided with an integral outer annular flange portion (118*c*, 120*c*); and further wherein said spring means includes:
   (1) a pair of annular spring retainer members (148, 150) mounted concentrically about said side gears between said side gear flange portions and said clutch members, respectively, said spring retainer members being in abutting engagement with said side gear annular flange portions, respectively; and
   (2) the pair of compression springs (154, 156) mounted concentrically about said side gears between said spring retainers and the associated clutch members, respectively.

4. A locking differential mechanism as defined in claim 3, wherein said central driver member has spline teeth (116*b*) on its outer circumferential surface, wherein the spline teeth non-rotatably connect said central driver member with said casing.

* * * * *